US 9,215,116 B2

(12) United States Patent  
Eiselt

(10) Patent No.: US 9,215,116 B2  
(45) Date of Patent: Dec. 15, 2015

(54) METHOD, TRANSMITTER AND RECEIVER DEVICE FOR TRANSMITTING A BINARY DIGITAL TRANSMIT SIGNAL OVER AN OPTICAL TRANSMISSION LINK

(71) Applicant: ADVA Optical Networking SE, Meiningen (DE)

(72) Inventor: Michael Eiselt, Kirchheim (DE)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 14/468,132

(22) Filed: Aug. 25, 2014

(65) Prior Publication Data

US 2015/0063823 A1    Mar. 5, 2015

(30) Foreign Application Priority Data

Aug. 27, 2013    (EP) ................................. 13004222

(51) Int. Cl.  
*H04B 10/04*    (2006.01)  
*H04L 27/06*    (2006.01)  
(Continued)

(52) U.S. Cl.  
CPC .......... *H04L 27/06* (2013.01); *H04B 10/07953* (2013.01); *H04B 10/5055* (2013.01); *H04B 10/5167* (2013.01); *H04B 10/541* (2013.01); *H04B 10/60* (2013.01); *H04L 27/04* (2013.01)

(58) Field of Classification Search  
CPC .. H04L 27/06; H04L 27/04; H04B 10/07953; H04B 10/5055; H04B 10/5167; H04B 10/541; H04B 10/60; H04B 10/505  
USPC .......... 398/140, 141, 182, 183, 186, 189, 190  
See application file for complete search history.

(56) References Cited

U.S. PATENT DOCUMENTS 5,543,952 A * 8/1996 Yonenaga ............ H04B 10/505  
    375/291  
5,892,858 A * 4/1999 Vaziri ..................... H03M 5/18  
    341/57

(Continued)

FOREIGN PATENT DOCUMENTS

| EP | 1185006 A2 | 3/2002 |
| EP | 1503501 A1 | 2/2005 |
| EP | 2081307 A1 | 7/2009 |

OTHER PUBLICATIONS

Kaiser et al, Simple Precoder for High-Speed Optical Duobinary Transmission, Journal of Optical Communications, 2002, pp. 26-28, vol. 23. (3 pages).

(Continued)

*Primary Examiner* — Hibret Woldekidan  
(74) *Attorney, Agent, or Firm* — The Culbertson Group, P.C.

(57) ABSTRACT

A method for transmitting a binary digital transmit signal over an optical transmission link includes creating a differential optical duobinary signal, supplying the differential optical duobinary signal to a first end of the optical transmission link, transmitting the differential optical duobinary signal to a second end of the optical transmission link, and receiving the differential optical duobinary signal as a receive signal at the second end of the optical transmission link. The differential optical duobinary signal may be created by pre-coding the binary digital transmit signal having a given bit interval (T) in two pre-coding steps each with a signal delay of a single bit interval or in a single pre-coding step with a signal delay of twice the bit interval. In each case the pre-coding applies a non-XOR or equivalent operation.

12 Claims, 9 Drawing Sheets

| Bit # | $S_{bTX}(t)$ | $S_{p_i}(t)$ | $S_{p_i}(t)$ | $S_{p,alt}(t)$ | $S_{dDB}(t)$ | $E_{oDDB}(t)$ | $S_{oDDB}(t)$ | $S_{RX}(t)$ filter 0.32 | $S_{RX1}(t)$ >higher threshold 0.75 | $S_{RX1}(t)$ >lower threshold 0.25 | $S_{bRX}(t)$ |
|---|---|---|---|---|---|---|---|---|---|---|---|
| 0 |   |   | 1 |   |   |   |   |   |   |   |   |
| 1 |   | 0 | 0 | 0 | 0.5 | 0 | 0 |   |   |   |   |
| 2 | 0 | 1 | 0 | 0 | 0 | -1 | 1 | 0.5 | 0 | 1 | 0 |
| 3 | 1 | 1 | 0 | 0 | 0 | -1 | 1 | 1 | 1 | 1 | 1 |
| 4 | 1 | 1 | 0 | 0 | 0 | -1 | 1 | 1 | 1 | 1 | 1 |
| 5 | 0 | 0 | 1 | 1 | 0.5 | 0 | 0 | 0.5 | 0 | 1 | 0 |
| 6 | 1 | 0 | 0 | 0 | 0.5 | 0 | 0 | 0 | 0 | 0 | 1 |
| 7 | 0 | 1 | 0 | 0 | 0 | -1 | 1 | 0.5 | 0 | 1 | 0 |
| 8 | 0 | 0 | 1 | 1 | 0.5 | 0 | 0 | 0.5 | 0 | 1 | 0 |
| 9 | 1 | 0 | 0 | 0 | 0.5 | 0 | 0 | 0 | 0 | 0 | 1 |
| 10 | 1 | 0 | 1 | 1 | 0.5 | 0 | 0 | 0 | 0 | 0 | 1 |
| 11 | 1 | 0 | 0 | 0 | 0.5 | 0 | 0 | 0 | 0 | 0 | 1 |
| 12 | 0 | 1 | 0 | 0 | 0 | -1 | 1 | 0.5 | 0 | 1 | 0 |
| 13 | 0 | 0 | 1 | 1 | 0.5 | 0 | 0 | 0.5 | 0 | 1 | 0 |
| 14 | 1 | 0 | 0 | 0 | 0.5 | 0 | 0 | 0 | 0 | 0 | 1 |
| 15 | 0 | 1 | 0 | 0 | 0 | -1 | 1 | 0.5 | 0 | 1 | 0 |
| 16 | 0 | 0 | 1 | 1 | 0.5 | 0 | 0 | 0.5 | 0 | 1 | 0 |
| 17 | 0 | 1 | 1 | 1 | 1 | 1 | 1 | 0.5 | 0 | 1 | 0 |
| 18 | 1 | 1 | 1 | 1 | 1 | 1 | 1 | 1 | 1 | 1 | 1 |
| 19 | 1 | 1 | 1 | 1 | 1 | 1 | 1 | 1 | 1 | 1 | 1 |

(51) Int. Cl.
*H04B 10/079* (2013.01)
*H04B 10/50* (2013.01)
*H04B 10/516* (2013.01)
*H04B 10/54* (2013.01)
*H04B 10/60* (2013.01)
*H04L 27/04* (2006.01)

(56) References Cited

U.S. PATENT DOCUMENTS

| | | | | |
|---|---|---|---|---|
| 6,388,786 B1* | 5/2002 | Ono | H04B 10/505 | 375/291 |
| 6,424,444 B1* | 7/2002 | Kahn | H04B 10/5161 | 398/141 |
| 6,522,438 B1* | 2/2003 | Mizuhara | H04L 25/497 | 398/158 |
| 6,865,348 B2* | 3/2005 | Miyamoto | H04B 10/505 | 398/182 |
| 7,006,770 B2* | 2/2006 | Akiyama | H04B 10/25133 | 398/147 |
| 7,280,767 B1* | 10/2007 | Ho | H04B 10/505 | 398/183 |
| 7,287,213 B1* | 10/2007 | Ho | H04B 10/5055 | 398/140 |
| 7,289,048 B2* | 10/2007 | Kim | H04B 10/505 | 341/111 |
| 7,340,182 B2* | 3/2008 | Uemura | H04J 3/047 | 398/182 |
| 7,536,112 B2* | 5/2009 | Yonenaga | H04B 10/505 | 398/183 |
| 7,542,631 B2* | 6/2009 | Yonenaga | H04B 10/505 | 385/129 |
| 7,555,222 B2* | 6/2009 | Rossetti | H04B 10/505 | 398/183 |
| 7,606,501 B2* | 10/2009 | Bai | H04B 10/5051 | 359/237 |
| 7,734,190 B2* | 6/2010 | Bai | H04B 10/505 | 398/182 |
| 7,792,433 B2* | 9/2010 | Bai | H04B 10/505 | 398/183 |
| 7,885,550 B2* | 2/2011 | Oberland | H04B 10/505 | 398/183 |
| 8,098,996 B2* | 1/2012 | Lyubomirsky | H04B 10/5167 | 398/183 |
| 8,311,416 B2* | 11/2012 | Bai | H04B 10/505 | 398/182 |
| 8,577,224 B2* | 11/2013 | Lyubomirsky | H04B 10/5167 | 398/183 |
| 8,712,254 B2* | 4/2014 | Jiang | H04B 10/25133 | 375/233 |
| 2004/0062554 A1* | 4/2004 | Lee | H04B 10/25137 | 398/201 |
| 2004/0086225 A1 | 5/2004 | Kim et al. | | |
| 2010/0232541 A1* | 9/2010 | Fukaishi | H04L 25/4923 | 375/291 |
| 2013/0177316 A1* | 7/2013 | Cardakli | H04J 14/06 | 398/79 |

OTHER PUBLICATIONS

Yoneyama et al., Differential Precoder IC Modules for Over-20-Gbit/s Optical Duobinary Transmission Systems, IEEE MTT-S Digest, 1999, pp. 189-192. (4 pages).

* cited by examiner

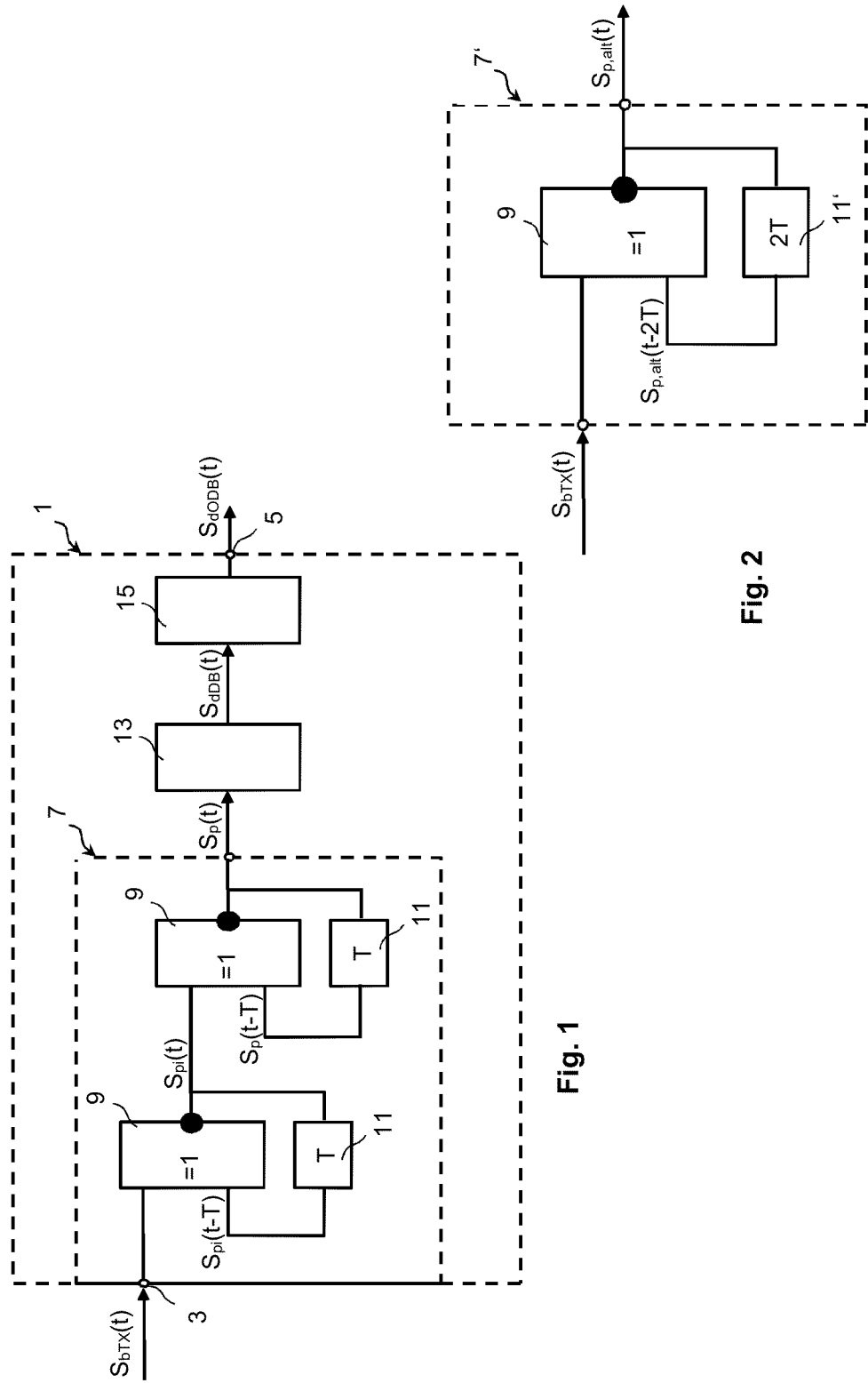

Fig. 5

| Bit # | $S_{bTX}(t)$ | $S_{pl}(t)$ | $S_p(t)$ | $S_{p,alt}(t)$ | $S_{dDB}(t)$ | $E_{dODB}(t)$ | $S_{dODB}(t)$ | $S_{RX}(t)$ filter 0.32 | $S_{RX1}(t)$ >higher threshold 0.75 | $S_{RX1}(t)$ >lower threshold 0.25 | $S_{bRX}(t)$ |
|---|---|---|---|---|---|---|---|---|---|---|---|
| 0 |   |   |   | 1 |   |   |   |   |   |   |   |
| 1 | 0 | 0 | 0 | 0 | 0.5 | 0 | 0 |   |   |   | 0 |
| 2 | 1 | 1 | 0 | 0 | 0 | -1 | 1 | 0.5 | 0 | 1 | 1 |
| 3 | 1 | 1 | 0 | 0 | 0 | -1 | 1 | 1 | 1 | 1 | 1 |
| 4 | 0 | 1 | 0 | 0 | 0 | -1 | 0 | 1 | 1 | 1 | 0 |
| 5 | 1 | 0 | 1 | 1 | 0.5 | 0 | 0 | 0.5 | 0 | 0 | 1 |
| 6 | 1 | 0 | 0 | 0 | 0.5 | 0 | 0 | 0 | 0 | 1 | 0 |
| 7 | 0 | 1 | 0 | 0 | 0 | -1 | 1 | 0.5 | 0 | 1 | 0 |
| 8 | 0 | 0 | 1 | 1 | 0.5 | 0 | 0 | 0.5 | 0 | 0 | 1 |
| 9 | 1 | 0 | 0 | 0 | 0.5 | 0 | 0 | 0 | 0 | 0 | 1 |
| 10 | 1 | 0 | 0 | 0 | 0.5 | 0 | 0 | 0 | 0 | 1 | 1 |
| 11 | 1 | 1 | 1 | 1 | 0 | -1 | 1 | 0.5 | 0 | 1 | 0 |
| 12 | 0 | 0 | 0 | 0 | 0.5 | 0 | 0 | 0.5 | 0 | 0 | 0 |
| 13 | 0 | 0 | 0 | 0 | 0.5 | 0 | 0 | 0 | 0 | 1 | 1 |
| 14 | 1 | 1 | 1 | 1 | 0 | -1 | 1 | 0.5 | 0 | 1 | 0 |
| 15 | 0 | 0 | 0 | 0 | 0.5 | 0 | 0 | 0.5 | 0 | 0 | 0 |
| 16 | 0 | 1 | 0 | 0 | 0.5 | 0 | 1 | 0.5 | 0 | 1 | 0 |
| 17 | 0 | 0 | 1 | 1 | 1 | 1 | 1 | 1 | 0 | 1 | 1 |
| 18 | 1 | 1 | 1 | 1 | 1 | 1 | 1 | 1 | 1 | 1 | 1 |
| 19 | 1 | 1 | 1 | 1 | 1 | 1 | 1 | 1 | 1 | 1 | 1 |

METHOD, TRANSMITTER AND RECEIVER DEVICE FOR TRANSMITTING A BINARY DIGITAL TRANSMIT SIGNAL OVER AN OPTICAL TRANSMISSION LINK

TECHNICAL FIELD OF THE INVENTION

The invention relates to methods for transmitting a binary digital transmit signal over an optical transmission link utilizing optical duobinary encoding. The invention also encompasses optical transmitter devices and optical receiver devices for realizing an optical duobinary transmission system.

BACKGROUND OF THE INVENTION

In optical transmission systems, Baud rates of 40 GBd and higher are used in order to increase the transmission capacity. When applying conventional coding and modulation methods like NRZ (non-return-to-zero) or RZ (return-to-zero), OOK (on-off-keying) high-speed transmitters and receivers revealing a respective high bandwidth are required. Further, in optical DWDM (dense wavelength division multiplex) systems revealing a channel spacing of 50 GHz, severe interference and distortion between channels occur if the Baud rate is increased to values greatly exceeding 40 GBd.

Optical duobinary (ODB) transmission technology, as e.g. described in US 2004/0086225 A1, is able to reduce the bandwidth requirements for optical transmitters and receivers. The optical duobinary signal that is transmitted over the optical transmission link reveals a reduced bandwidth as compared to a standard NRZ OOK optical signal. Thus, channel interference and distortion is avoided and the costs for lower bandwidth transmitters and receivers are reduced. Further, optical duobinary transmission is less sensitive to chromatic dispersion as neighboring "1" bits or symbols separated by a single "0" bit or symbol, only, are transmitted at a 180 degree phase shift with respect to the electric field vector, so that interfering portions of corresponding neighboring bits or symbols at least partially cancel each other.

At this point, it shall be noted that the symbol rate of an ODB signal is equal to the bit rate of the binary digital transmit signal that has been pre-coded and duobinary encoded for creating the ODB signal.

However, at the receiver side, the bandwidth requirement in case of ODB transmission is still in the region of the bit rate or symbol rate. Lower bandwidth and therefore cheaper components can only be used together with electronic post-processing, e.g. maximum likelihood sequence estimation (MLSE). However, this increases the complexity and thus the costs of the electronic equipment.

SUMMARY OF THE INVENTION

It is thus an object of the present invention to provide a modified ODB transmission method which reduces the bandwidth requirement at the transmitter and/or the receiver side so that the costs for the receiver equipment are reduced. It is a further object of the invention to provide a transmitter device and a receiver device suitable to build up an optical transmission system which realizes the method according to the invention.

According to a first alternative of the invention, a differential optical duobinary coded (dODB) signal is created by pre-coding the binary digital transmit signal having a bit interval T into a first pre-coded digital signal, the pre-coding operation being identical with or equivalent to applying a non-XOR operation to the binary digital transmit signal and the binary digital transmit signal delayed by a single bit interval, again pre-coding the first pre-coded digital signal into a second pre-coded digital signal, this second pre-coding operation being identical with or equivalent to applying a non-XOR operation to the first pre-coded digital signal and the first pre-coded digital signal delayed by a single bit interval, duobinary encoding the second pre-coded signal, and modulating an optical light source having a predetermined optical wavelength using the second pre-coded signal as modulate signal.

According to a second alternative of the invention, a differential optical duobinary coded (dODB) signal is created by directly pre-coding the binary digital transmit signal having a given bit interval into the second pre-coded digital signal, the pre-coding operation being identical with or equivalent to applying a non-XOR operation to the binary digital transmit signal and the binary digital transmit signal delayed by twice the bit interval, duobinary encoding the second pre-coded signal, and modulating an optical light source having the predetermined optical wavelength using the second pre-coded signal as modulate signal.

Of course, the duobinary encoding of the pre-coded signals may in both alternatives be effected by either using a suitably designed low-pass filter, which has e.g. a bandwidth of approximately 0.28 times the bit rate, or using a modulo 2 counter for adding the values of two adjacent bits and multiplying the result with a factor 0.5 which is equal to amplifying the result using an amplifier having a gain of 0.5.

For creating the optical signal, a Mach-Zehnder modulator (MZM) may be used as in case of standard ODB transmission.

In both alternatives, the dODB signal created is supplied to a first end of the optical transmission link and transmitted to a second end of the optical transmission link. The dODB signal is received at the second end of the optical transmission link by direct detection, that is by detecting the optical power of the differential optical duobinary signal and creating a binary digital receive signal corresponding to the binary digital transmit signal by decoding the receive signal.

No error propagation is observed in both alternatives.

According to an embodiment of the invention, the binary digital receive signal may be created by interpreting the receive signal as a binary digital signal, sampling and recovering the receive signal using a single decision threshold and creating a binary digital recovered signal revealing a "1" level, if the sampled values are above the decision threshold, and a "0" level, if the sampled values are below or equal to the decision threshold, and applying a non-XOR operation onto the binary digital recovered signal and the binary digital recovered signal delayed by a single bit interval.

In this embodiment, the receive signal is sampled at sampling points in time lying, with regard to an eye diagram of the receive signal, essentially in a time range in the middle between crossing points defined by, among others, first alternating signal sequences starting with a "1" bit in the receive signal and second alternating signal sequences starting with a "0" bit in the receive signal. That is, in these embodiments, standard ODB receiver equipment may be used in combination with a succeeding decoding stage. However, compared to a standard ODB signal, a lower transmit bandwidth and a lower drive amplitude for the MZM is possible, which increases the transmission performance.

According to another embodiment of the invention, the binary digital receive signal may be created by interpreting the receive signal as a ternary digital signal, sampling and recovering the receive signal using a first and a second decision threshold and creating a first binary digital recovered signal revealing a "1" level, if the sampled values are above the first decision threshold, and a "0" level, elsewise, and creating a second binary digital recovered signal revealing a "1" level, if the sampled values are above the second decision threshold, and a "0" level, elsewise, and applying a non-XOR operation onto the first and second binary intermediate receive signal.

In this embodiment, the receive signal is sampled at sampling points in time lying, with regard to an eye diagram of the receive signal, essentially in a time range of crossing points defined by, among others, first alternating signal sequences starting with a "1" bit in the receive signal and second alternating signal sequences starting with a "0" bit in the receive signal. Each of the two sampling points lies within a lower or an upper eye of the eye diagram, respectively.

Of course, in each embodiment, the sampling points in time may be chosen at points in time at which the respective eye or the two respective eyes (one above the other) reveal its maximum heights.

According to a further embodiment, at least one of the receive signal, the modulate signal and the optical duobinary signal may be low-pass filtered in such a way that the bit error rate of the binary digital receive signal or another parameter linked to the bit error rate is minimized or at least lower than a predetermined value. Of course, instead of separately filtering the modulate signal, which is identical with the differential duobinary encoded signal, using a separate low-pass filter device the low-pass filter device used as duobinary encoder devices may reveal a suitable filter bandwidth.

Especially in embodiments using the ternary signal detection, the receive signal may be low-pass filtered in such a way that the bandwidth of the low-pass filtered receive signal is within the range of 0.25 to 0.35 times the bit rate, preferably in the range of 0.28 to 0.32 times the bit rate.

This filtering can be effected by separate or integrated electrical or optical low-pass filters or by other components used in the transmitter or receiver devices which have a corresponding low-pass filter characteristic. Especially, the characteristic behavior of an opto-electrical receiver element, like a photodiode, having a corresponding restricted bandwidth may be used to effect the desired low-pass filtering of the respective signal.

According to an embodiment of the invention, the modulate signal is low-pass filtered in such a way that the bandwidth of the low-pass filtered modulate signal is lower than in case of standard optical duobinary coded transmission, preferably in the range of 0.22 to 0.24 times the bit rate.

These and other advantages and features of the invention will be apparent from the following description of illustrative embodiments, considered along with the accompanying drawings.

BRIEF DESCRIPTION OF THE DRAWINGS

In the following, the invention will be described with reference to the embodiments apparent from the drawings. In the drawings:

FIG. 1 is a schematic block diagram of an embodiment of a transmitter device for creating a dODB signal including a pre-coder device according to a first alternative;

FIG. 2 is a schematic block diagram of a pre-coder device according to a second alternative for use in the transmitter device in FIG. 1;

FIG. 5 is a bit table for explaining the functional behavior of various components of a dODB transmission system according to the invention using a receiver device according to FIG. 3;

DESCRIPTION OF ILLUSTRATIVE EMBODIMENTS

Figure 3:
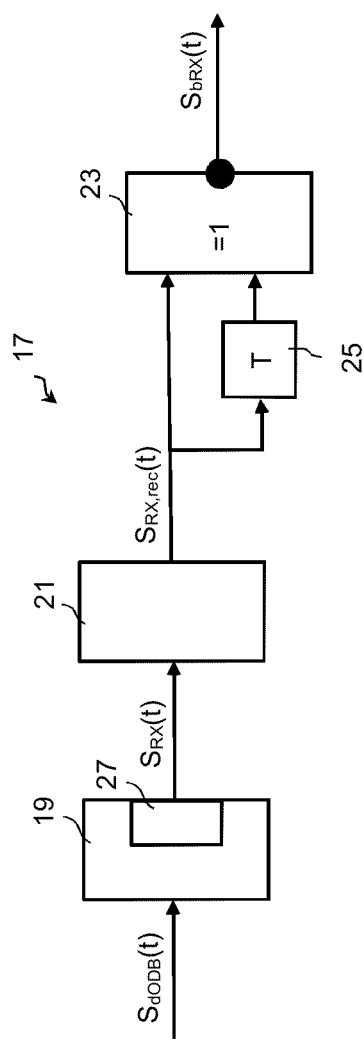
FIG. 3 is a schematic block diagram of a first embodiment of a receiver device for receiving a dODB signal and creating a binary digital receive signal.

FIG. 1 shows a transmitter device 1 for creating a dODB signal $S_{dODB}$ according to a binary digital transmit signal $S_{bTX}$ which is received at an input port 3. The dODB signal $S_{dODB}$ is supplied to an optical transmission link (not shown) that is connectable to an output port 5 of the transmitter device 1.

The transmitter device 1 comprises a pre-coder device 7, which, in this embodiment, includes two identical pre-coding stages each including a non-XOR gate 9 and a delay device 11. Each of the two pre-coding stages is identical with the pre-coding stage of a standard ODB transmitter device.

The first pre-coding stage receives the binary digital transmit signal $S_{bTX}(t)$ at a first input port of the non-XOR gate 9 and creates as an output signal an intermediate pre-coded signal $S_{pi}(t)$ by applying a non-XOR operation on the binary digital transmit signal $S_{bTX}(t)$ and the output signal $S_{pi}(t-T)$ delayed by a single bit interval. The delay of the signal $S_{bTX}(t)$ is effected by a delay device 11 which is connected, with its input port, to the output port of the non-XOR gate 9 and, with its output port, to a second input port of the non-XOR gate 9. It can be shown that this non-XOR operation is equivalent to an XOR operation applied on the inverted binary digital transmit signal $S_{bTX}(t)$ and the delayed output signal $S_{pi}(t)$. That is, the function of the first pre-coding stage can be mathematically expressed as $$S_{pi}(t) = \overline{S_{TX}(t) \oplus S_{pi}(t-T)} = \overline{S_{TX}(t)} \oplus S_{pi}(t-T) \quad (1)$$

The second pre-coding stage reveals the same structure as the first pre-coding stage and receives the intermediate pre-coded signal $S_{pi}(t)$ at a first input port of the respective non-XOR gate 9 and creates as an output signal a pre-coded signal $S_p(t)$ by applying a non-XOR operation on the intermediate pre-coded signal $S_{pi}(t)$ and the output pre-coded signal $S_p(t-T)$ delayed by a single bit interval. Of course, this non-XOR operation is likewise equivalent to an XOR operation applied on the inverted intermediate pre-coded signal $S_{pi}(t)$ and the delayed pre-coded signal $S_p(t-T)$. The function of this second pre-coding stage may be mathematically expressed as $$S_p(t)=\overline{S_{pi}(t)\oplus S_p(t-T)}=\overline{S_{pi}(t)}\oplus S_p(t-T) \quad (2)$$

As known for effecting the pre-coding for ODB signals the non-XOR operation or XOR operation including the inversion of the respective input signal can be replaced by an inversion operation for the respective input signal and an AND operation on the inverted input signal and a clock signal having a clock rate identical with the bit rate of the input signal followed by a modulo 2 counter, which can be realized by a toggle flip flop (see e.g. W. Kaiser, W. Rosenkranz, "Simple Precoder for High-speed Optical Duobinary Transmission", Journal of Optical Communications, 23 (2002) I, pages 22-28).

The pre-coded signal $S_p(t)$ is supplied to an input port of a duobinary encoder device 13 which converts this signal into a differential duobinary signal $S_{dDB}(t)$ supplied to an optical modulator device 15. Generally, the signals including the binary digital transmit signal $S_{bTX}(t)$ and the differential duobinary signal $S_{dDB}(t)$ are electrical signals. The optical modulator device 15 converts the electrical differential duobinary signal $S_{dDB}(t)$ into the dODB signal $S_{dODB}(t)$ having properties similar to those of a usual ODB signal apart from the fact that the duobinary encoding is applied to a pre-coded signal that has been created in a differing manner.

As well known to a person skilled in the art, a suitably designed low-pass filter may be used as encoder device 13. This realization is of course much simpler than applying an add operation on the pre-coded signal $S_p(t)$ and the pre-coded signal $S_p(t-T)$ delayed by one bit.

The optical modulator device may be realized using an MZM that is biased at null and driven by the differential duobinary signal $S_{dDB}(t)$.

Instead of the two-stage pre-coder device 7 according to FIG. 1, a single stage pre-coder device 7' as shown in FIG. 2 may be used for creating the pre-coded signal $S_p(t)$. This pre-coder device 7' comprises a non-XOR gate 9 which receives the binary digital transmit signal $S_{bTX}(t)$ at a first input port. A pre-coded signal $S_{p,alt}(t)$ that is output at a respective output port is fed back to a delay device 11' which delays the pre-coded signal $S_{p,alt}(t)$ by two bit intervals. The delayed signal $S_{p,alt}(t-2T)$ is supplied to a second input port of the non-XOR gate 9. It can be shown that the effect of this single-stage pre-coder device 7' is identical with the effect of the two-stage pre-coder device 7 shown in FIG. 1, i.e. the pre-coded signal $S_{p,alt}(t)$ is identical with the pre-coded signal $S_p(t)$. The mathematical operation of the single-state pre-coder device 7' can be written as $$S_{p,alt}(t)=\overline{S_{TX}(t)\oplus S_{p,alt}(t-2T)}=\overline{S_{TX}(t)}\oplus S_{p,alt}(t-2T) \quad (3)$$

FIG. 3 shows a schematic block diagram of a first embodiment of a receiver device 17 adapted to receive and decode the differential optical duobinary signal $S_{dODB}(t)$ received at the far end of the optical transmission link. For simplicity, the dODB signal received is also designated as $S_{dODB}(t)$ although the signal properties are influenced by the properties of the optical transmission link, especially the dispersion and attenuation characteristics or even non-linear properties of the transmission link, including the influences of optical passive and active components.

The receiver device 17 is a direct optical receiver device and comprises an opto-electrical converter device 19, e.g. including a photodiode, which supplies an electrical receive signal $S_{RX}(t)$ corresponding to the optical power of the dODB signal $S_{dODB}(t)$ received to a sampling device 21. The sampling device 21 is also configured to determine the sampling points in time at which it is determined whether the electrical signal amplitude of the electrical receive signal $S_{RX}(t)$ (corresponding to the optical power of the dODB signal received) exceeds a predetermined decision threshold or whether the signal amplitude is lower than the decision threshold. The recovered receive signal $S_{RX,rec}(t)$ that is output by the sampling device 21 reveals "1" bits if the signal amplitude exceeded the decision threshold and "0" bits elsewise.

The decision threshold may also be determined by the sampling device 21 or supplied to the sampling device 21 from an external unit (not shown). The decision threshold may be determined as 0.5 times the signal value occurring for long series of "1" bits in the dODB signal (with respect to the optical power of the dODB signal).

In order to create a binary digital receive signal $S_{bRX}(t)$ corresponding to the binary digital transmit signal $S_{bTX}(t)$, the recovered receive signal $S_{RX,rec}(t)$ is supplied to a decoder stage including a non-XOR gate 23 and a delay device 25. The signal $S_{RX,rec}(t)$ is supplied to a first input port of the non-XOR gate 23 and an input port of the delay device 25. The signal delayed by one bit interval $S_{RX,rec}(t-T)$ is supplied to a second input port of the delay device 23. The decoded signal or binary digital receive signal $S_{bRX}(t)$ is output at an output port of the non-XOR gate 23. The decoding operation may be mathematically written as $$S_{bRX}(t)=\overline{S_{RX,rec}(t)\oplus S_{RX,rec}(t-T)} \quad (4)$$

The electro-optical converter device 19 may also include a filter device 27 for electrically low-pass filtering the opto-electrically converted signal. The filter bandwidth may be chosen as in case of usual ODB signal transmission and equal, e.g. a value of 0.7 times the bit rate of the dODB signal. The low-pass filter 27 may, of course, also be realized as optical low-pass filter, which is located before the opto-electrical converter element. The low-pass filter 27 may also be integrated within the opto-electrical converter element, e.g. within a photodiode, revealing a corresponding bandwidth, so that no separate low-pass filter is required. The filtering can also be effected at the transmitter side wherein the filter characteristic of a suitable optical filter is applied to the dODB signal.

Figure 6A:
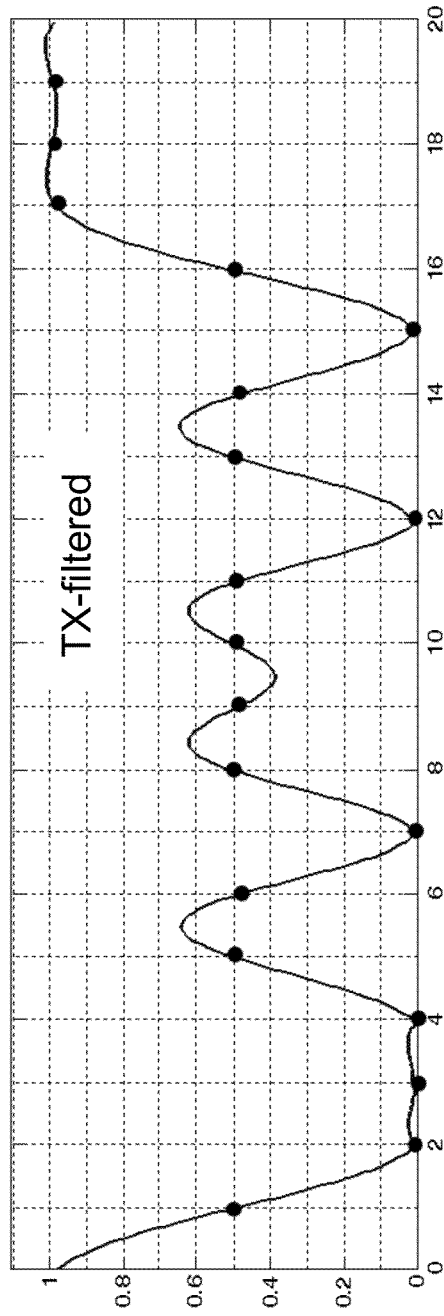
FIG. 6A is a diagram showing the time dependency of the modulating signal $S_{dBD}(t)$.
Figure 6B:
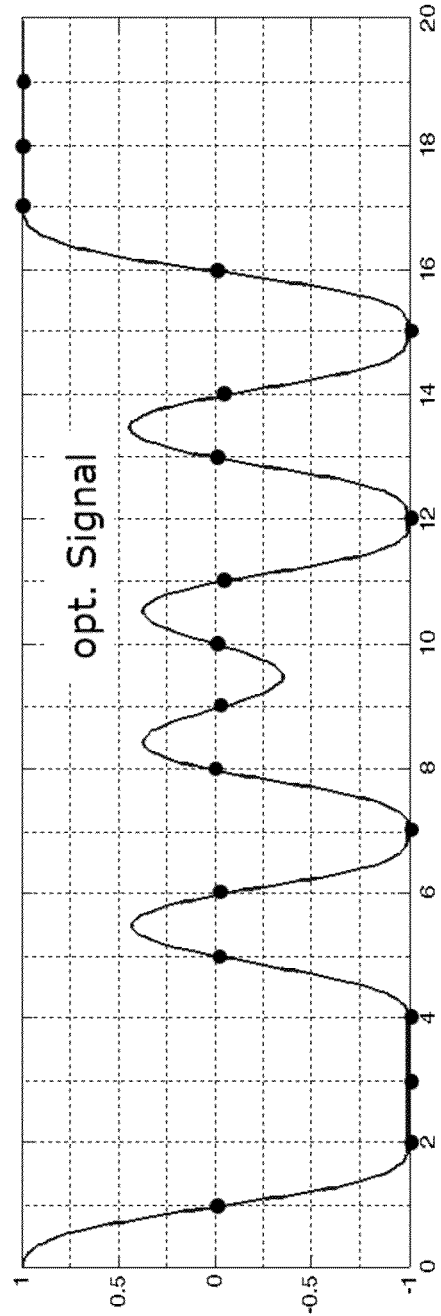
FIG. 6B is a diagram showing the time dependency of the optical dODB signal $E_{dODB}(t)$ (electrical field amplitude)
Figure 6C:
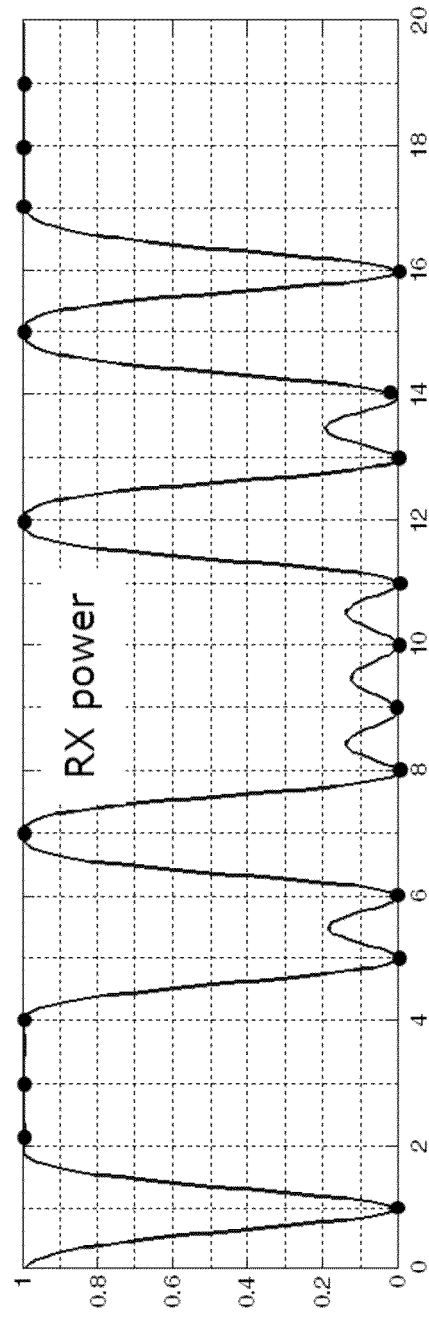
FIG. 6C is a diagram showing the time dependency of the optical dODB signal $S_{dODB}(t)$ (optical power)
Figure 7:
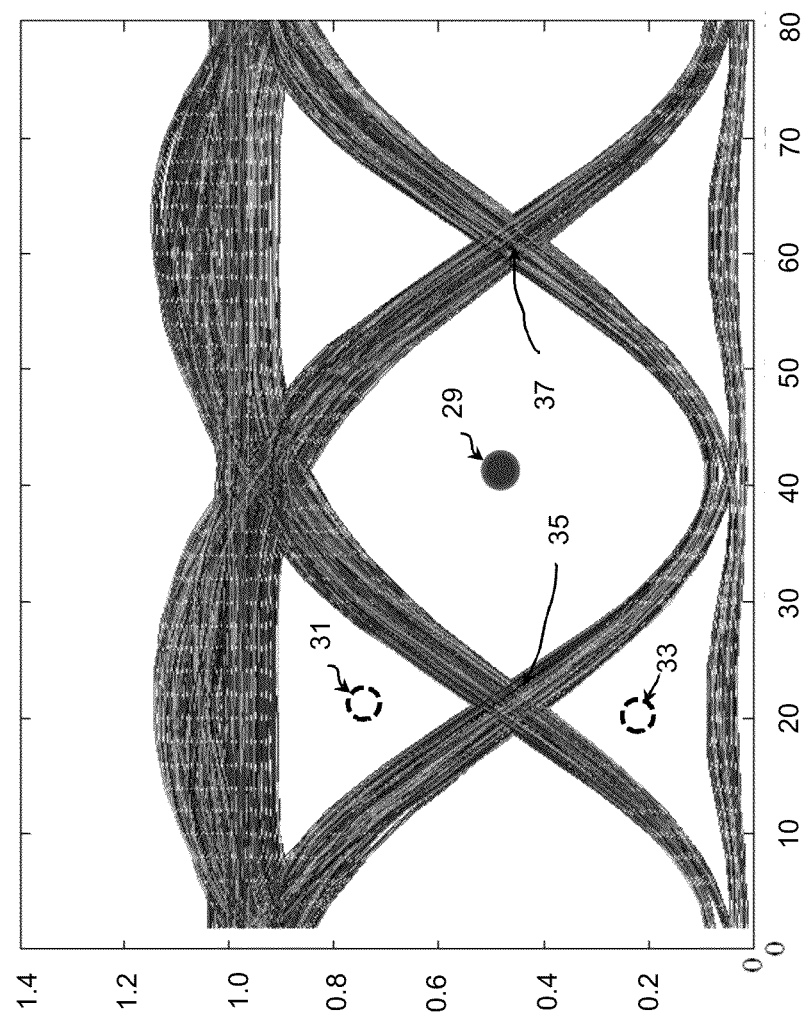
FIG. 7 is an eye diagram of the receive signal of a dODB transmission system using a receiver device according to FIG. 3.

The behavior of a duobinary transmission system including a transmitter device 1 comprising a pre-coder device 7 or 7' and a receiver device 17 according to FIG. 3 is exemplified by means of the bit table according to FIG. 5, the respective time dependent courses of the signals $S_{dBD}(t)$, $E_{dODB}(t)$ and $S_{dODB}(t)$ in FIGS. 6A to 6C and the eye diagram in FIG. 7.

FIGS. 6A-C show the courses of the respective signals for the bit series of a binary digital transmit signal $S_{bTX}$ included in the second column of the table in FIG. 5. On the horizontal axis the number of the bits (first column in the table of FIG. 5) is shown and the vertical axis shows the normalized values (between 0 and 1) of the respective signals. The third and fourth columns of FIG. 5 reveal the bit values of the intermediate pre-coded signal $S_{pi}$ and the pre-coded signal $S_p$, respectively, according to the operations included in equations (1) and (2). Column 5 of FIG. 5 includes the (identical) bit values of the signal $S_{p,alt}$ in case a single-stage pre-coder device according to FIG. 2 is used.

The use of a low-pass filter device 13 (FIG. 1) for creating the duobinary modulate signal $S_{dDB}(t)$ by low-pass filtering the signals $S_p(t)$ or $S_{p,alt}(t)$ having a bandwidth of approximately 0.28 times the bitrate leads to a signal $S_{dDB}(t)$, designated as "TX-filtered" in FIG. 6A, that intersects the 0.5 value approximately in the middle of the respective bit intervals. Thus, the ternary signal $S_{dBD}(t)$ reveals, at sampling points in the middle of the bit width, values of 0, 0.5 and 1, respectively.

The optical signal $E_{dODB}(t)$ created by the MZM 15, shown in FIG. 6B, reveals values −1, 0 and 1 corresponding to values 0, 0.5 and 1 in the modulate signal $S_{dDB}(t)$. It is to be noted that the optical signal $E_{dODB}(t)$ represents the amplitude of the electrical field vector of the optical signal produced by the MZM or optical modulator device 15, respectively.

The signal $S_{dODB}(t)$ corresponding to the optical power is shown in FIG. 6C. Assuming a high quality (with respect to dispersion and attenuation) optical transmission link, this leads to an eye diagram as shown in FIG. 7. The eye diagram is depicted for a width of two bit intervals on the horizontal axis and a normalized signal amplitude between values of 0 and 1 on the vertical axis. For recovering the signal $S_{dODB}(t)$ received at the far end of the transmission link, the signal can be sampled at points in time located in the middle of the wide open eye, i.e. at values "40" of the horizontal time axis in FIG. 7, in which a 25 Gbit/s (or GBd) signal is shown.

Recovering the clock and the signal $S_{RX}(t)$ received which has also been filtered using the low-pass filter 27 (essentially restricting the bandwidth of the signal to the bandwidth used by a usual duobinary signal, e.g. using a filter having a 3 dB bandwidth of approx. 0.7 times the bit rate) can be effected as known in the art so that a further description can be omitted.

The decision threshold for recovering the signal received by simply sampling the signal at given points in time used for a signal as shown in FIG. 7 may be chosen at a normalized signal value of 0.5. The respective sampling point 29 at points in time of 40 ps (the middle of the open eye) and at a signal value of 0.5 is shown in FIG. 7.

As can easily be verified, applying the decoding operation according to equation (4) to the bits in column eight of the table in FIG. 5 of the optical signal $S_{dOBD}(t)$, the course of which, under the assumption of a high quality transmission link, is almost equal to the signal received and filtered $S_{RX}(t)$, results in the bits of the original binary digital transmit signal $S_{bTX}(t)$ according to column 2 of the table in FIG. 5.

While receiving the optical signal $S_{dODB}(t)$ available at the far end of the transmission link using the receiver device 17 according to FIG. 3 and the method explained above leads to a merely small reduction in the bandwidth required, in the following a receiver device and method for receiving the signal $S_{dODB}(t)$ will be described which saves more than half of the bandwidth required at the receiver side. This results in much less expensive receiver components.

Figure 4:
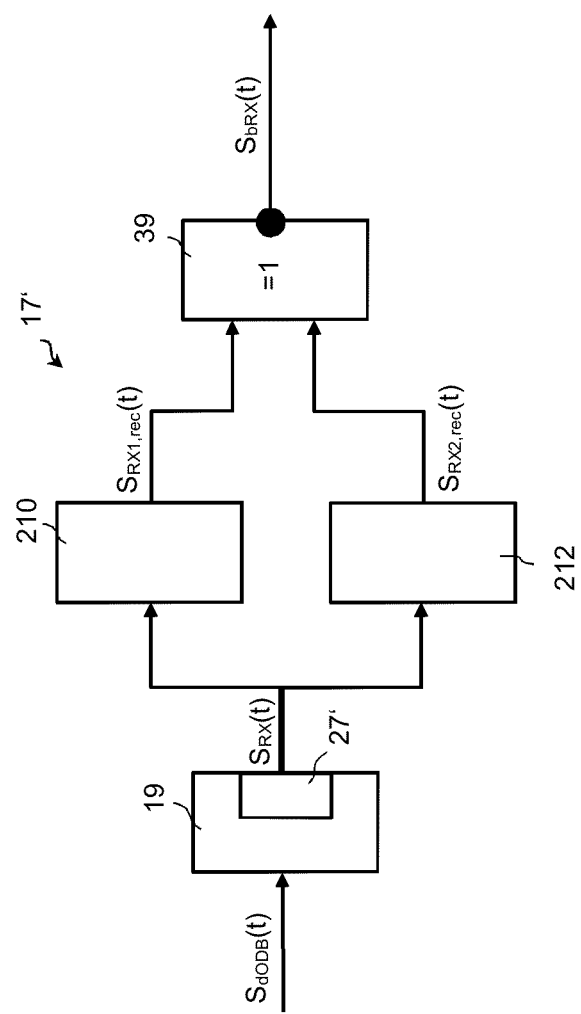
FIG. 4 is a schematic block diagram of a second embodiment of a receiver device for receiving a dODB signal and creating a binary digital receive signal.

As apparent from FIG. 4, the respective receiver device 17' comprises an opto-electrical converter device 19 realizing the functionality as explained above in connection with the receiver device 17. However, the bandwidth of the low-pass filter device 27' is drastically lower than the bandwidth of the low-pass filter device 27 and lies in the region of approximately within the range of 0.25 to 0.35 times the bit rate, preferably in the range of 0.28 to 0.32 times the bit rate. Especially a filter bandwidth of approximately 0.30 times the bit rate has been found to lead to an optimum Q-factor of the binary digital receive signal $S_{bRX}(t)$.

The receiver device 17' comprises two sampling devices 210, 212, each of which receives the receive signal $S_{RX}(t)$ as input signal. The sampling devices 210, 212 are adapted to sample the input signal at predetermined sampling points in time, which may be determined by one of the sampling devices and supplied to the respective other sampling device. Of course, also both of the sampling devices 210, 212 may be configured to determine the sampling points separately. In this case, the sampling points for the two sampling devices may also differ to a small extent.

Figure 8:
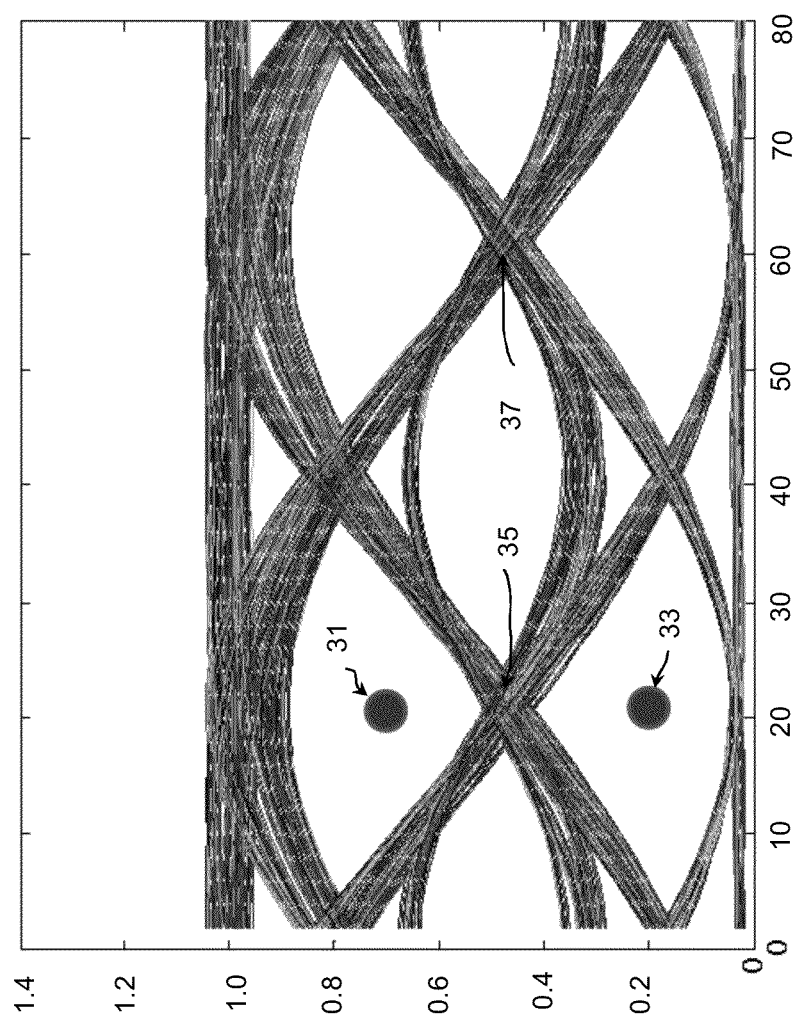
FIG. 8 is an eye diagram of the receive signal of a dODB transmission system using a receiver device according to FIG. 4.

FIG. 8 shows an eye diagram for a 25 Gbit/s (more exactly for a 25 GBd) receive signal $S_{RX}(t)$ that has the same dimensions for the horizontal and vertical axes as the eye diagram shown in FIG. 7. The signal $S_{RX}(t)$ in this case is filtered using a low-pass filter device 27 having a bandwidth of 0.32 times the bit rate.

The two sampling devices 210, 212 effect the sampling using two different decision thresholds, e.g. a first higher threshold of approximately 0.75 applied by the sampling device 210 and a second lower threshold of approximately 0.2 (or 0.25, as used in the table of FIG. 5) applied by the sampling device 212. While in the embodiment of a receiver device 17 according to FIG. 3 the signal is sampled at approx. 40 ps in the eye diagram according to FIG. 7, in this embodiment of a receiver device 17' according to FIG. 4 the respective input signals are sampled at approx. 20 ps (or 60 ps), i.e. at points in time in which the eye diagram shows two eyes lying one over the other. These two sampling points having the above coordinates in the eye diagram are indicated in FIG. 8 by reference numerals 31 and 33, respectively.

As apparent from FIG. 7, the sampling points in time suitable for the detection method applied by the embodiment of a receiver device 17 according to FIG. 3 can be determined with regard to the eye diagram of the receive signal $S_{RX}(t)$ to lie in a time range in the middle between crossing points 35, 37 defined by, among others, first alternating signal sequences starting with a "1" bit in the receive signal $S_{RX}(t)$ and second alternating signal sequences starting with a "0" bit in the receive signal $S_{RX}(t)$. These crossing points lie at 20 ps and 60 ps for the 25 Gbit/s signal shown in FIG. 7, so the sampling points in time are determined to lie at 40 ps.

As can be seen from FIG. 8, the sampling points in time suitable for the detection method applied by the embodiment of a receiver device 17' according to FIG. 4 can be determined by identifying, with regard to the eye diagram of the receive signal $S_{RX}(t)$, a time range of crossing points 35, 37 defined by, among others, first alternating signal sequences starting with a "1" bit in the receive signal and second alternating signal sequences starting with a "0" bit in the receive signal.

In this way, the sampling devices 210, 212 create a first and a second binary digital recovered signal $S_{RX1,rec}(t)$ and $S_{RX2,rec}(t)$ which are supplied to a first and a second input port of a non-XOR gate 39. The non-XOR gate 39 effects the decoding of the receive signal $S_{RX}(t)$ by applying a non-XOR operation on the two intermediate binary digital signals and outputs the binary digital receive signal $S_{bRX}(t)$. This decoding operation may mathematically be written as $$S_{bRX}(t) = \overline{S_{RX1,rec}(t) \oplus S_{RX2,rec}(t)} \qquad (5)$$

Figure 6D:
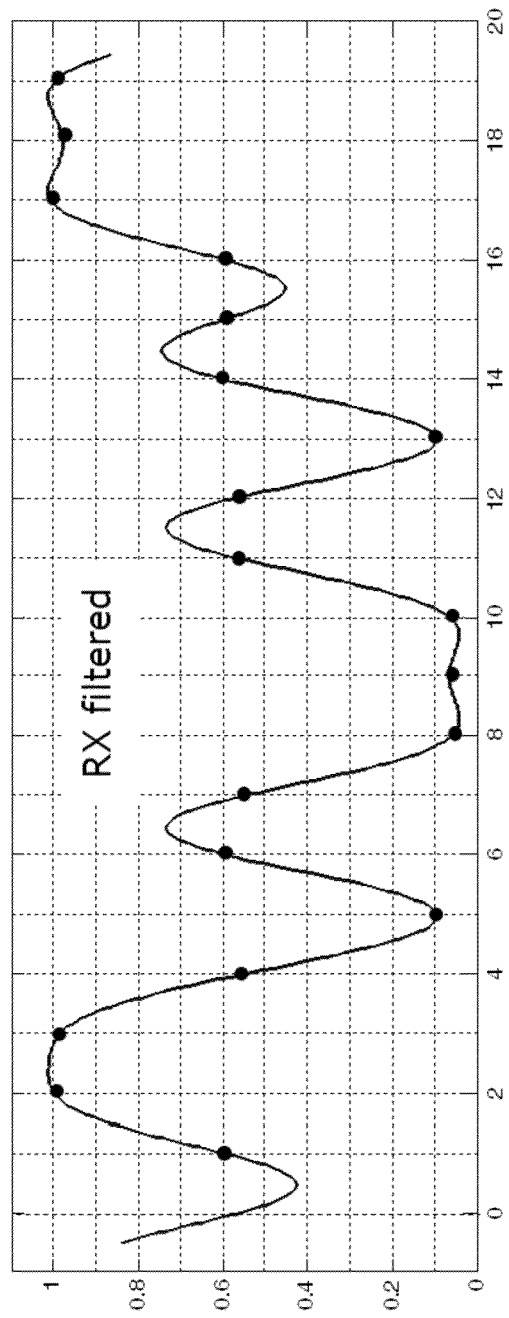
FIG. 6D is a diagram showing the time dependency of the low-pass filtered receive signal $S_{RX}(t)$.

This functionality is apparent from the last four columns of the table in FIG. 5 showing the bits series of the filtered receive signal $S_{RX}(t)$, the two binary digital recovered signals $S_{RX1,rec}(t)$ and $S_{RX,rec}(t)$ and the decoded binary digital receive signal $S_{bRX}(t)$ in case of a binary digital transmit signal $S_{bTX}(t)$ revealing the bit series according to the second column in the respective table. Here, for simplicity, it is assumed that the bandwidth of the low-pass filter 27 is chosen in such a way that the filtered signal $S_{RX}(t)$ at an actual sampling point equals the average of the respective sampled value and the preceding sampled value. The corresponding course in time of the filtered signal $S_{RX}(t)$ is shown in FIG. 6D.

Of course, the receiving method described above with reference to FIGS. 4, 5, 6A-D, and 8 can also be applied if the low-pass filter device 27 reveals a higher bandwidth, e.g. a bandwidth of 0.7 times the bit rate as assumed during the description of the receiving method carried out by the receiver device 17 in FIG. 3. This would mean to supply a signal according to FIG. 7 to the two sampling devices 210, 212 of the receiver device 17' in FIG. 4 and sampling the receive signal according to FIG. 7 using the two sampling points 31, 33 indicated by dashed lines. However, in this case of a higher bandwidth receive signal, the advantage of the method using two decision thresholds would not be utilized, namely, being capable of using receiver components having a lower bandwidth, only, and still receiving the dODB signal with a sufficiently high quality, especially a sufficiently low bit error rate or high Q-factor.

Figure 9:
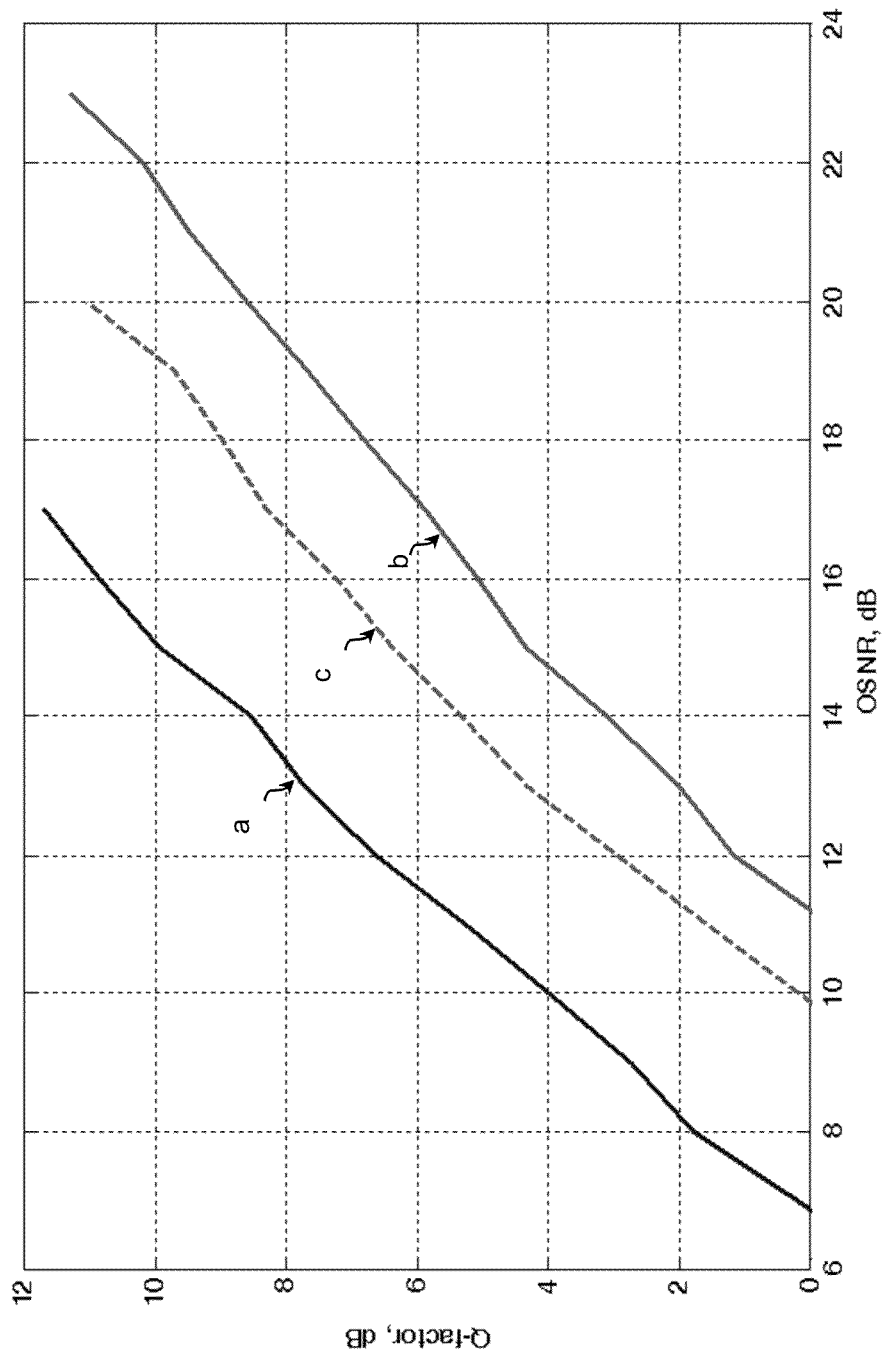
FIG. 9 is a diagram showing the dependency of the Q-factor of the binary digital receive signal $S_{bRX}(t)$ on the signal-to-noise ratio of the dODB signal $S_{dODB}(t)$ received using the receiver device and method according to FIG. 4 as compared to the transmission of a conventional ODB signal.

FIG. 9 shows a diagram illustrating the dependency of the Q-factor of the binary digital receive signal $S_{bRX}(t)$ on the signal-to-noise ratio of the dODB signal $S_{dODB}(t)$ received using a direct detection receiver according to FIG. 4 (and the respective receiving method explained above) as compared to the transmission of a conventional ODB signal (no additional decoding stage is necessary as in case of a dODB signal according to the present invention). Curve (a) represents the dependency of a conventional ODB signal filtered at the receiver side using a filter bandwidth of 0.7 times the bit rate, i.e. using a filter bandwidth of 17.5 GHz for a ODB signal at 25 Gbit/s. Curves (b) and (c) in FIG. 9 are respective curves for a dODB signal that is filtered with a filter device 27 having a bandwidth of 0.32 (curve b), i.e. 8 GHz at 25 GBd, or 0.30 (curve c), i.e. 7.5 GHz at 25 GBd, respectively. At the transmitter side, for creating the ODB signal, a low-pass filter (either for effecting the duobinary encoding or a separate filter device for filtering the modulate signal $S_{dDB}(t)$) having a bandwidth of 0.28 times the bit rate was assumed when simulating the curve (a) in FIG. 9. The same low-pass filter bandwidth was assumed for creating the dODB signal for simulating curve (b). A low-pass filter at the transmitter side having a reduced bandwidth of 0.22 times the bit rate was assumed when simulating curve (c) in FIG. 9.

As apparent from FIG. 9, using a conventional ODB signal leads, of course, to a higher Q-factor, i.e. a lower bit error rate, than using the dODB signal according to the present invention and the receiver device 17' according to FIG. 4 in connection with a drastically reduced receiver bandwidth of less than half the bandwidth of the conventional receiver device. FIG. 9, however, shows that the performance of the receiver and method according to the invention can be improved by approximately 2.5 dB optical signal-to-noise ratio (OSNR) when using a reduced bandwidth of 0.22 times the bit rate at the transmitter side.

The optimum combination of the filter bandwidth at the transmitter side and the filter bandwidth at the receiver side can easily be determined, e.g. by using a suitable simulation method or empirically.

Thus, the various embodiments of the invention provide methods and systems for transmitting data as a modified ODB signal requiring a reduced bandwidth for the receiver or the receiver components.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing actions, functions, characteristics, or features of multiple elements, and any such use of the term "each" is in the inclusive sense unless specifically stated otherwise. For example, if a claim defines at least two of a given element as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention.

LIST OF REFERENCE SIGNS 1 transmitter device
3 input port
5 output port
7, 7' pre-coder device
9 non-XOR gate
11, 11' delay device
13 duobinary encoder device, low-pass filter device
15 optical modulator device
17, 17' optical receiver device
19, 19' opto-electrical converter device
21 sampling device
23 non-XOR gate
25 delay device
27, 27' low-pass filter device
29 sampling point (coordinates in the eye diagram: point in time; decision threshold)
31 sampling point
33 sampling point
35 crossing point
37 crossing point
39 non-XOR gate
210 sampling device
212 sampling device
T bit interval of the binary digital transmit signal
$S_{dODB}(t)$ differential optical duobinary (dOBD) signal
$S_{dDB}(t)$ modulate signal or differential duobinary (dBD) signal
$S_{bTX}(t)$ binary digital transmit signal
$S_{pi}(t)$ intermediate pre-coded signal
$S_p(t)$ pre-coded signal
$S_{p,alt}(t)$ pre-coded signal
$S_{RX}(t)$ electrical receive signal
$S_{RX,rec}(t)$ recovered receive signal
$S_{RX1,rec}(t)$ first recovered receive signal
$S_{RX2,rec}(t)$ second recovered receive signal
$S_{bRX}(t)$ binary digital receive signal

The invention claimed is:

1. A method for transmitting a binary digital transmit signal having a given bit interval over an optical transmission link, the method including:
 (a) creating a pre-coded digital signal by one of:
  (i) performing a first pre-coding operation to pre-code the binary digital transmit signal into an intermediate pre-coded digital signal, the first pre-coding operation being identical with or equivalent to applying a non-XOR operation to the binary digital transmit signal and the intermediate pre-coded digital signal delayed by one bit interval, and performing a second pre-coding operation to pre-code the intermediate pre-coded digital signal into the pre-coded digital signal, the second pre-coding operation being identical with or equivalent to applying a non-XOR operation to the intermediate pre-coded digital signal and the pre-coded digital signal delayed by one bit interval, or (ii) performing a direct pre-coding operation to pre-code the binary digital transmit signal into the pre-coded digital signal, the direct pre-coding operation being identical with or equivalent to applying a non-XOR operation to the binary digital transmit signal and the pre-coded digital signal delayed by two bit intervals;

(b) duobinary encoding the pre-coded digital signal into a differential duobinary signal;

(c) applying the differential duobinary signal to modulate an optical light source of an optical modulator device having a predetermined optical wavelength to create a differential optical duobinary signal;

(d) supplying the differential optical duobinary signal to a first end of the optical transmission link and transmitting the differential optical duobinary signal to a second end of the optical transmission link;

(e) detecting the optical power of the differential optical duobinary signal at the second end of the optical transmission link to create a receive signal and processing the receive signal to create a binary digital receive signal corresponding to the binary digital transmit signal;

(f) wherein the binary digital receive signal is created by, (i) interpreting the receive signal as ternary digital signal, sampling the receive signal using a first and a second decision threshold and creating a first binary digital recovered signal revealing a "1" level, if the respective sampled value is above the first decision threshold, and a "0" level, elsewise, and creating a second binary digital recovered signal revealing a "1" level, if the respective sampled value is above the second decision threshold, and a "0" level, elsewise, and (ii) applying a non-XOR operation onto the first and second binary digital recovered signals to create the binary digital receive signal; and (g) wherein the receive signal or the optical differential duobinary signal is low-pass filtered in such a way that the bandwidth of the respective low-pass filtered signal is within the range of 0.25 to 0.35 times the bit rate of the binary digital transmit signal.

2. The method of claim 1 wherein sampling the receive signal includes sampling the receive signal at sampling points in time lying, with regard to an eye diagram of the receive signal, in a time range of crossing points defined by first alternating signal sequences starting with a "1" bit in the receive signal and second alternating signal sequences starting with a "0" bit in the receive signal.

3. The method of claim 2 wherein that the sampling points in time are chosen at points in time at which the respective eye reveals its maximum height.

4. The method of claim 1 further including low-pass filtering at least one of the receive signal, the differential duobinary signal, and the differential optical duobinary signal in such a way that the bit error rate of the binary digital receive signal is minimized or lower than a predetermined value.

5. The method of claim 1 wherein the receive signal or the optical differential duobinary signal is low-pass filtered in such a way that the bandwidth of the respective low-pass filtered signal is within the range of 0.28 to 0.32 times the bit rate of the binary digital transmit signal.

6. The method of claim 1 further including low-pass filtering the differential duobinary signal in such a way that the bandwidth of the low-pass filtered differential duobinary signal is in the range of 0.22 to 0.24 times the bit rate of the binary digital transmit signal.

7. An optical transmitter device adapted to receive a binary digital transmit signal at a transmitter input port and to output a differential optical duobinary signal at a transmitter output port, the optical transmitter device including:

(a) a pre-coder device operable to create a pre-coded digital signal by one of:

(i) performing a first pre-coding operation to pre-code the binary digital transmit signal into an intermediate pre-coded digital signal, the first pre-coding operation being identical with or equivalent to applying a non-XOR operation to the binary digital transmit signal and the intermediate pre-coded digital signal delayed by one bit interval, and performing a second pre-coding operation to pre-code the intermediate pre-coded digital signal into the pre-coded digital signal, the second pre-coding operation being identical with or equivalent to applying a non-XOR operation to the intermediate pre-coded digital signal and the pre-coded digital signal delayed by one bit interval, or (ii) performing a direct pre-coding operation to pre-code the binary digital transmit signal into the pre-coded digital signal, the direct pre-coding operation being identical with or equivalent to applying a non-XOR operation to the binary digital transmit signal and the pre-coded digital signal delayed by two bit intervals;

(b) a duobinary encoder device operable to encode the pre-coded digital signal into a differential duobinary signal;

(c) an optical modulator device operable to modulate an optical light source having a predetermined optical wavelength to create a differential optical doubinary signal, the optical modulator device using the differential duobinary signal as a modulate signal to create the differential optical doubinary signal; and (d) wherein the duobinary encoder device is realized as a low pass filter device to filter the pre-coded digital signal, or further including a separate low-pass device operable to low-pass filter the modulate signal.

8. The optical transmitter device of claim 7 wherein the duobinary encoder device is realized as the low-pass filter device and has a bandwidth in the range of 0.22 to 0.24 times the bit rate of the binary digital transmit signal.

9. The optical transmitter device of claim 7 wherein the optical transmitter device includes the separate low-pass filter device and the separate low-pass filter device has a bandwidth in the range of 0.22 to 0.24 times the bit rate of the binary digital transmit signal.

10. An optical receiver device adapted to be connected to an optical transmission link to receive a differential optical duobinary signal produced by, (i) creating a pre-coded digital signal by one of:

performing a first pre-coding operation to pre-code a binary digital transmit signal into an intermediate pre-coded digital signal, the first pre-coding operation being identical with or equivalent to applying a non-XOR operation to the binary digital transmit signal and the intermediate pre-coded digital signal delayed by one bit interval, and performing a second pre-coding operation to pre-code the intermediate pre-coded digital signal into the pre-coded digital signal, the second pre-coding operation being identical with or equivalent to applying a non-XOR operation to the intermediate pre-coded digital signal and the pre-coded digital signal delayed by one bit interval, or performing a direct pre-coding operation to pre-code the binary digital transmit signal into the pre-coded digital signal, the direct pre-coding operation being identical with or equivalent to applying a non-XOR operation to the binary digital transmit signal and the pre-coded digital signal delayed by two bit intervals;
  (ii) duobinary encoding the pre-coded signal into a differential duobinary signal, and
  (iii) applying the differential duobinary signal to modulate an optical light source of an optical modulator device to create the differential optical duobinary signal, the optical receiver device including:
(a) an electro-optical converter device operable to convert the differential optical duobinary signal to a receive signal;
(b) a low-pass filter arrangement operable to low-pass filter the receive signal in such a way that the bandwidth of the low-pass filtered receive signal is within the range of 0.25 to 0.35 times the bit rate of the binary digital transmit signal;
(c) a sampling device arrangement operable to interpret the low-pass filtered receive signal as a ternary digital signal using a first and a second decision threshold and creating a first binary digital recovered signal revealing a "1" level, for each sampled value above the first decision threshold, and a "0" level, elsewise, and creating a second binary digital recovered signal revealing a "1" level for each sampled value above the second decision threshold, and a "0" level, elsewise; and
(d) a non-XOR gate operable to apply a non-XOR operation to the first and second binary digital recovered signals to create a binary digital receive signal to be output at an output port of the optical receiver device.

11. The optical receiver device of claim 10 wherein the sampling device arrangement is configured to sample the receive signal at sampling points in time lying, with regard to an eye diagram of the receive signal, essentially in a time range of crossing points defined by first alternating signal sequences starting with a "1" bit in the receive signal and second alternating signal sequences starting with a "0" bit in the receive signal.

12. The optical receiver device of claim 10 wherein the low-pass filter arrangement is configured to low-pass filter the receive signal in such a way that the bandwidth of the low-pass filtered receive signal is within the range of 0.28 to 0.32 of the bit rate of the binary digital transmit signal.

* * * * *